US006799723B2

(12) United States Patent
Kotob et al.

(10) Patent No.: US 6,799,723 B2
(45) Date of Patent: Oct. 5, 2004

(54) AUTOMATED VOTING SYSTEM

(76) Inventors: Moutaz Kotob, 5150 Remington Rd., Bettendorf, IA (US) 52722; Ralph J. Anderson, 4 Red Oak Ct., Moline, IL (US) 61265; Jay C. Bennett, Jr., 2327 Palmera Ct., Bettendorf, IA (US) 52722; Paul T. VanCamp, 1309 Crow Creek, Bettendorf, IA (US) 52722; David J. Steil, 6522 Thomas Ct., Bettendorf, IA (US) 52722

( * ) Notice: Subject to any disclaimer, the term of this patent is extended or adjusted under 35 U.S.C. 154(b) by 0 days.

(21) Appl. No.: 09/023,556

(22) Filed: Feb. 13, 1998

(65) Prior Publication Data

US 2001/0013547 A1 Aug. 16, 2001

(51) Int. Cl.[7] ........................ G06F 17/60
(52) U.S. Cl. ........................ 235/386; 705/12
(58) Field of Search ........................ 235/375, 381, 235/386, 51, 54 R, 54 C, 55 R, 56; 705/12

(56) References Cited

U.S. PATENT DOCUMENTS 4,066,871 A * 1/1978 Cason, Sr. et al. ............ 235/54
4,774,665 A * 9/1988 Webb ......................... 364/409
5,189,288 A * 2/1993 Amno et al. ................ 235/386
5,218,528 A * 6/1993 Wise et al. ................. 364/409
5,278,753 A * 1/1994 Graft, III .................... 364/409
5,583,329 A * 12/1996 Davis, III et al. ............ 235/50
5,732,222 A * 3/1998 Miyagawa et al. ......... 395/212
5,758,325 A * 5/1998 Lohry et al. .................. 705/12
5,878,399 A * 3/1999 Peralto ........................ 705/12
6,073,054 A * 6/2000 Katayama et al. ............ 700/28
6,250,548 B1 * 6/2001 McClure et al. .............. 235/51

* cited by examiner

*Primary Examiner*—Michael G. Lee
*Assistant Examiner*—Jamara A. Franklin
(74) *Attorney, Agent, or Firm*—H. Vincent Harsha

(57) ABSTRACT

An automated voting system comprising single or multiple voting stations for controlling and being a voting station simultaneously. The voting system includes an integrated pointing device with graphical user interface for displaying the ballots. The voting stations may or may not be interconnected and indeed may operate as a single unit as a complete polling station. The voting system will track the number of votes and continuously display the number of votes cast on a counter system as it clearly displays the voter intent. The automated voting system also provides security for the voter and the system both internal and external. The external security system may be controlled by the polling authorities while the internal security system operates independently. The automated voting system is also capable of providing multiple ballot styles in one or more voting units and provides a touch electronic keyboard for write-in candidates. The automated voting system will also print on separate printers the tally results at the polling place and/or transmit the tally to a central collection position. The automated voting system also allows the voter to void the ballot prior to casting of the vote and then permit re-establishment of the voting unit.

14 Claims, 6 Drawing Sheets

FLOW DIAGRAM OF THE START-UP OF THE TOTAL VOTING SYSTEM

FLOW DIAGRAM OF THE TOTAL VOTING SYSTEM

FLOW DIAGRAM OF THE START-UP OF THE TOTAL VOTING SYSTEM

FLOW DIAGRAM OF THE ELECTION AND PRECINCT SETUP

FLOW DIAGRAM OF THE SUMMARY OF VOTING WITH AND WITHOUT POLL WORKER STATION

FLOW DIAGRAM OF THE VOTING PROCEDURE WITH THIS INVENTION

AUTOMATED VOTING SYSTEM

TECHNICAL FIELD OF THE INVENTION

This invention relates to Automated Voting Systems and more particularly to a system for verifying registered voters and collecting and tabulating votes from a single or a plurality of voting mechanisms.

BACKGROUND OF THE INVENTION

As is well known, and has been set forth by the political pundits and the electorate, voter privacy and the requirement of security i.e. that the ballots all be verified and be counted accurately with no ballots which have not been correctly filled out to be counted. One method is providing security at the voting site with voter poll watchers. This has been the traditional method of providing for the accuracy and authenticity of the vote and the voting results.

The use of authorized voting personnel to verify each voters name and verify that they are the person whom they represent to be from a master list of registered voters and providing a paper ballot to the voter has worked well in the past. However, this procedure is slow by today's standards and there is the potential for inaccurate counting and/or having ballots which have not been properly filled out counted. Verification systems must maintain the privacy of the voter so that names are not associated with the ballots once the ballots have been issued to the voters or voted by voter.

Another method of casting ballots is the use of mechanical devices to present the voters selection, after verification i.e. a ballot form adjacent the mechanical levers. Another method of casting ballots is for the voter to punch holes in a computer card where each hole represents a certain candidate or issue on the ballot. The cards are then machine read and votes tabulated.

These methods have disadvantages and they may be potentially inaccurate, i.e. the vote may not be registered in the case of the mechanical lever for some mechanical reason or the cards with the punched holes provide no way for a voter to change their minds.

With the requirement in some voting districts that the ballots including any local issues be in a different language i.e. Spanish or some other language. An automated system which will automatically on command present the ballots in the required language would be useful.

Several automated voting systems have been used wherein computers have aided in the gathering and counting of the votes. Two U.S. patents which describe automated voting systems are U.S. Pat. No. 4,774,665 and U.S. Pat. No. 5,218,528. These patents describe systems wherein there is either a number of precinct or local stations voting work stations for tabulating the votes and a central work station for controlling the programming and tabulating at the precinct stations.

BRIEF SUMMARY OF THE INVENTION

This invention overcomes many of the problems associated with the traditional methods of voting including prior electronic voting systems while maintaining all the advantages of the prior systems. This invention includes the vote entry station, which incorporates an integrated computer program with an integrated pointing device with graphical user interface for displaying the ballots or issues on a screen. The vote entry station incorporates all requisite functions and is unitary and self standing. The programmed vote entry station has an electronic keypad/keyboard for display and entry of write-in candidates. It also permits the voting for more than one write-in candidate, if allowed.

In addition, the program protects from overvotes while allowing voters to change their vote prior to casting. The program contained in the voting device at the vote entry station, either a single unit or multiple units permits tracking the number of votes cast by each unit and the entry station displays the count.

Advantages of this system also include the fact that the voting entry stations are capable of being programmed by one or more election workers to provide all voter entry stations with multiple ballot screens and styles. The voter can select the language to be displayed on the ballots. The vote entry station is activated by at least one activation code entered by the election workers to prevent fraud.

There may also be an election unit in data communication with the vote entry station to provide information and verification of such things as the voter authorization code, verification of the voter registration data. This unit may also be programmed to verify voter signature, voter fingerprints, voter voice print, voter eye print and can also update voter history.

Advantages of this voter system include the ability to have an automated voting system which comprises either a single voting device which will perform all of the functions described above or utilizing the identical voting device as a host or control unit so that various voting stations may be controlled from one unit. The voting system is controlled by authorization codes which verify voter approval, utilizes election security cards to verify and activate the operation of the voter system equipment. The equipment is not operable except by the use of the proper election security card which usually is provided in sealed envelopes by the election authority.

Each individual one of these vote entry stations provides for data communication between the stations and between the stations and any central vote collection storage unit. In addition, this election device provides for the automatic printing or separate printer on hard copy of test results to verify the accuracy and of the final tabulation of the votes.

DETAILED DESCRIPTION OF THE INVENTION

The voting system uses either single or multiple voting stations, each station having at least one voting device which may be stored in a transport case. Each transport case or unit will have numbered seals that will be checked out to particular precincts for use with voting stations.

Once the poll workers arrive at the polling place with the voting stations they will remove the voting unit or units from the transport cases and place the voting stations or units inside each voting booth. The voting station comprises a computer with program graphical unit including a user interface for displaying ballots and other information the requisite computer programs for recording are within the unit.

Each voting station may have its own power source or there may be a single source for several stations and each voting station requires at least one election security card which is normally provided by the election authority in a sealed security envelope. Poll workers must insert the election security card in each voting device to permit operation.

Figure 1:
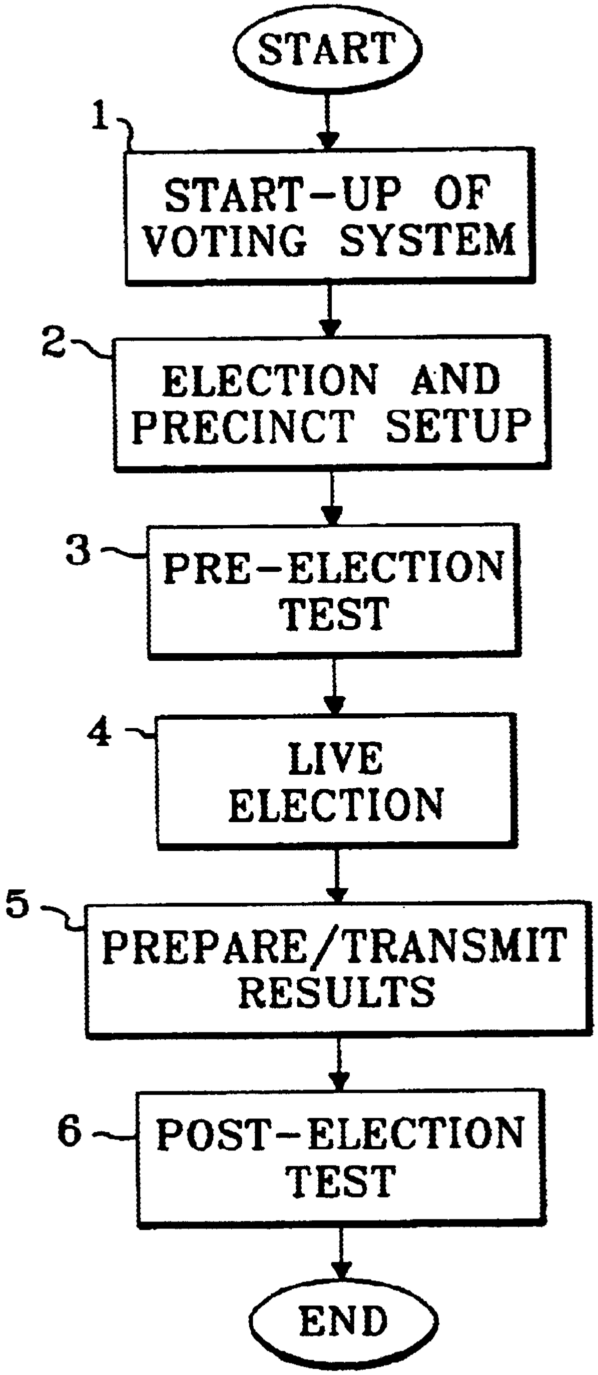
FIG. 1—is a flow chart of the total voting system.
Figure 2:
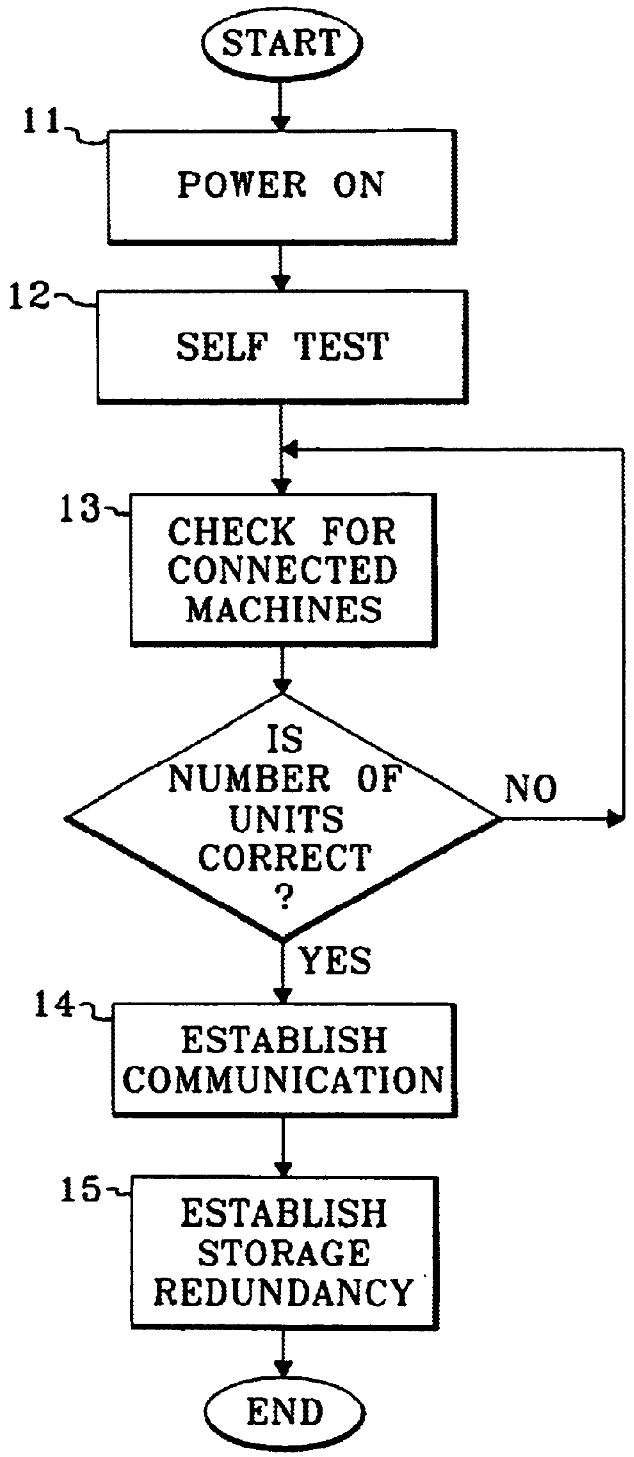
FIG. 2—is a flow diagram of the start-up of the voting system.

Once the power has been connected to the voting station and the election security cards installed the power may be turned on for each voting station. When the voting stations or devices are turned on the units will work for a short period of time then displays the number of devices that are being connected in the precinct for confirmation. Once this question is answered, the units will complete the set up automatically. FIG. 2 is the flow chart for starting the voting system including one or more voter stations this includes checking for connected machine 13, and establish storage redundancy, 15.

The screen will next read "press here" to continue as host. One voting station should then be designated as the host unit or as the poll official station to control all the voting stations.

The host unit will then display on the screen the date and election being held at that time and in this jurisdiction. This display will give the poll worker an opportunity to say whether or not this information is correct.

Figure 3:
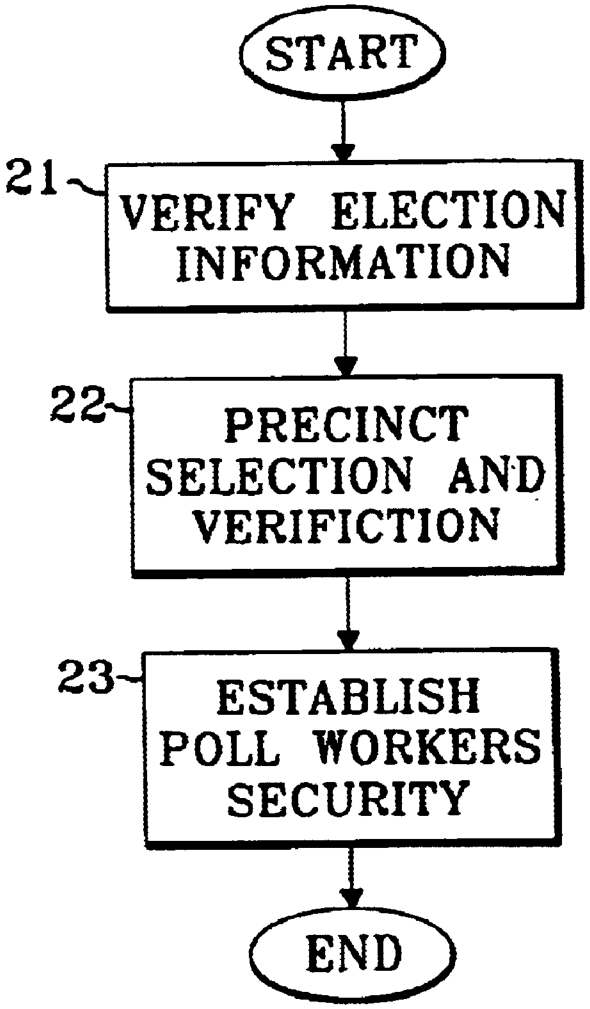
FIG. 3—is a flow diagram of the election and precinct setup.

Once the host unit is selected and in charge the flow chart of FIG. 3 illustrates the steps necessary to verify and start up the voting station or stations. The poll worker on the host unit has before it on the screen the presentation to enter the precinct code and password 22. This precinct code and password are provided in a secured envelope by the election authority. When the precinct number and password are entered, the precinct name and active ballot styles will appear in the proper boxes on the screen. The poll worker will confirm this information with the information in the security envelope. If the information agrees it will be accepted on the screen. Then the next step is 23 i.e. to secure the voting devices for poll workers assigned to work in the given precinct or polling place. The name, initials and numeric password (up to six digits) will be entered into the system. Each poll worker will enter his or her name, initials and the numeric password which may be any number the poll worker chooses. Now only these people are authorized to operate these devices. An internal operations log is maintained in the program for election validation if required.

Before taking any election votes the poll workers can vote a series of pre-selected ballot configurations. These pre-election tests will verify that the voting devices are tabulating properly. At the conclusion of the pre-test the results of the pre-test are printed out and the poll workers may compare them to the pre-set documentation provided by the election authority in the security envelope. If the numbers do not match, the program resets to zero, and the test is repeated.

In all cases the program resets the counter to zero before voting begins. After voting has begun and shut down occurs, any vote is maintained upon restarting. The poll workers will then move to the next step in the set up process and activate the printer which will automatically print out the zero report. The zero report will be signed and the pre-election report may be signed by the poll workers and placed in a container specified by the election office. At this point, the poll workers will turn off the printer if correct the poll workers then secure numbered seals also provided by the election authority to the back-lock mechanism on each voting station. The poll workers will record on an affidavit provided by the election authority the numbers from the seals and the devices to which each was secured, and we are now ready to begin live elections.

In addition, if required, the poll official station can be programmed to verify fingerprints, voiceprints, eyeprint information, capture fingerprint, voiceprint or eyeprint information.

Figure 4:
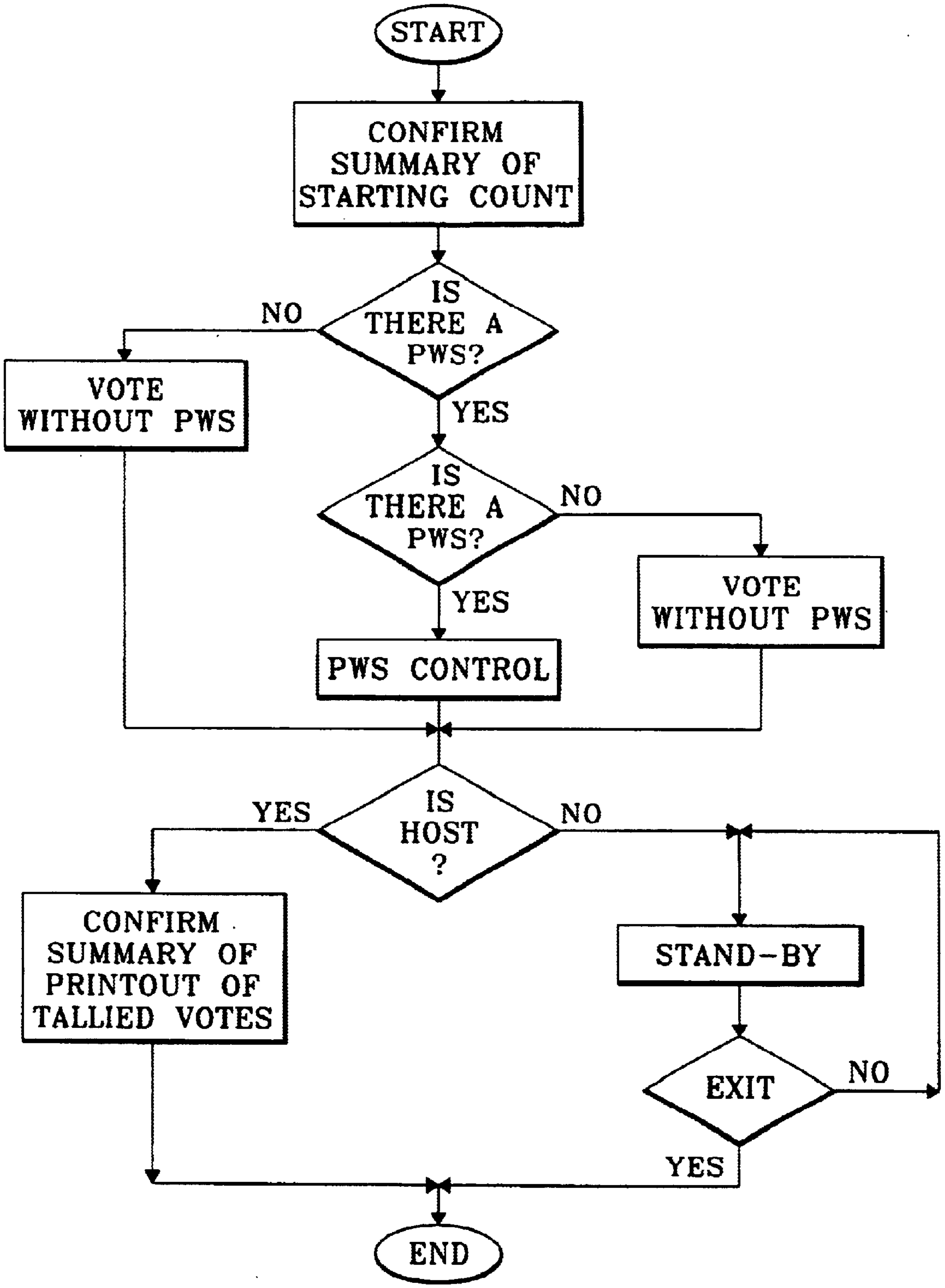
FIG. 4—is a flow chart showing the summary of the voting with and without a poll worker station.

Once the voter has been authorized the voter will be assigned to a voting booth where normally the openings of the voting booth are turned away from the poll workers station. In the voting booth the poll worker will activate a ballot on the voting device for the individual by keying in an authorization code. In the case of split precincts, a ballot style choice and an authorization code both would be required. Flow chart of FIG. 4 shows the flow chart for voting both with and without a poll worker station.

When accept is pressed, the first page of the actual ballot will appear on the screen. If reject is pressed the ballot is rejected and the poll worker must reconfirm the voters ballot style by pressing the correct ballot style and rekeying the authorization code. The identical picture is displayed again for the voter to choose and after accepting the voter can now begin voting.

Figure 5:
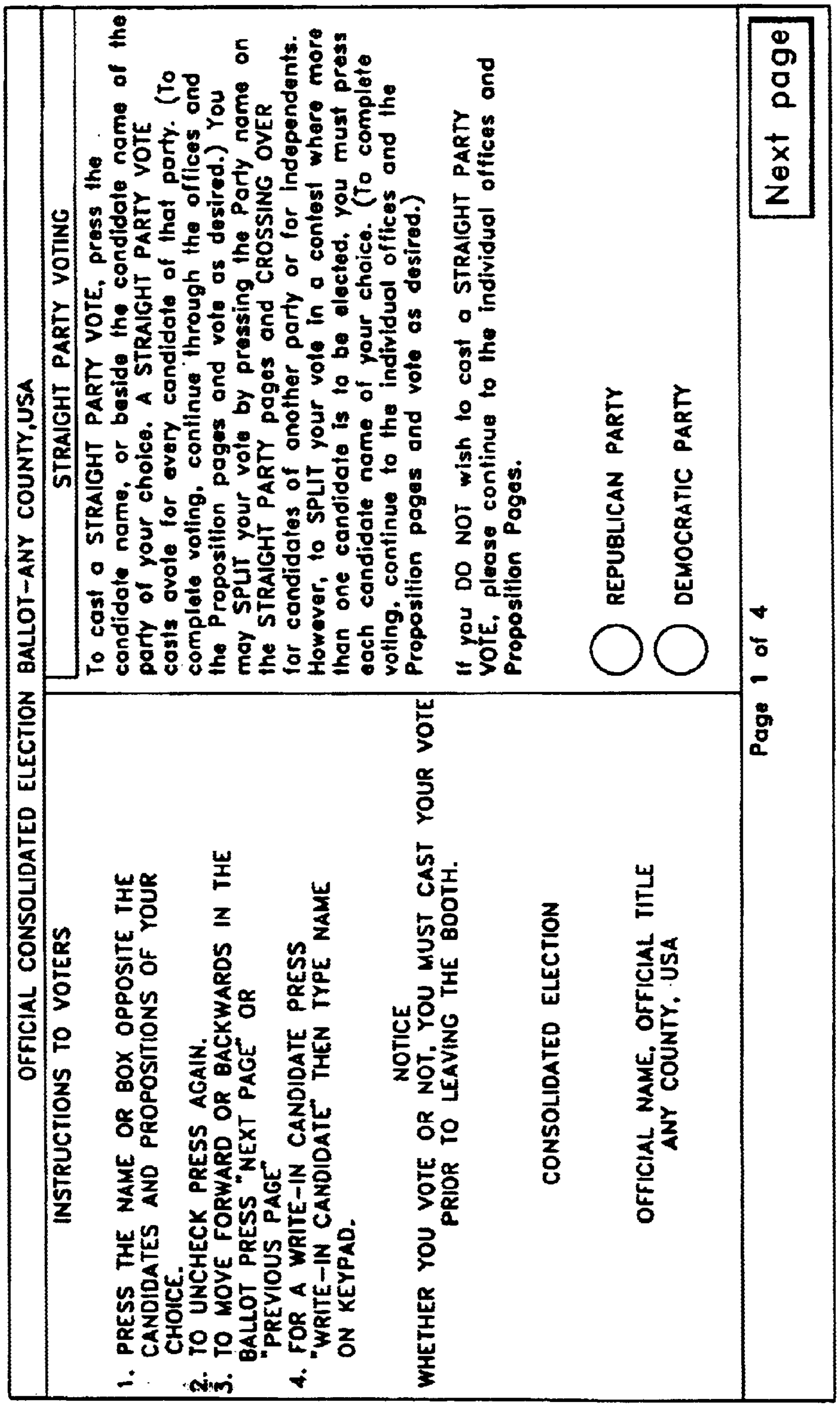
FIG. 5—is a depiction of the second page of a ballot.

The graphical interface as depicted on the screen of this invention provides continued assistance during the entire voting process. The first screen will normally provide instructions in the use of this system and subsequent screen will lead voters through each race and page. FIG. 5 is an illustration representing page two of four ballot pages or screens.

Figure 6:
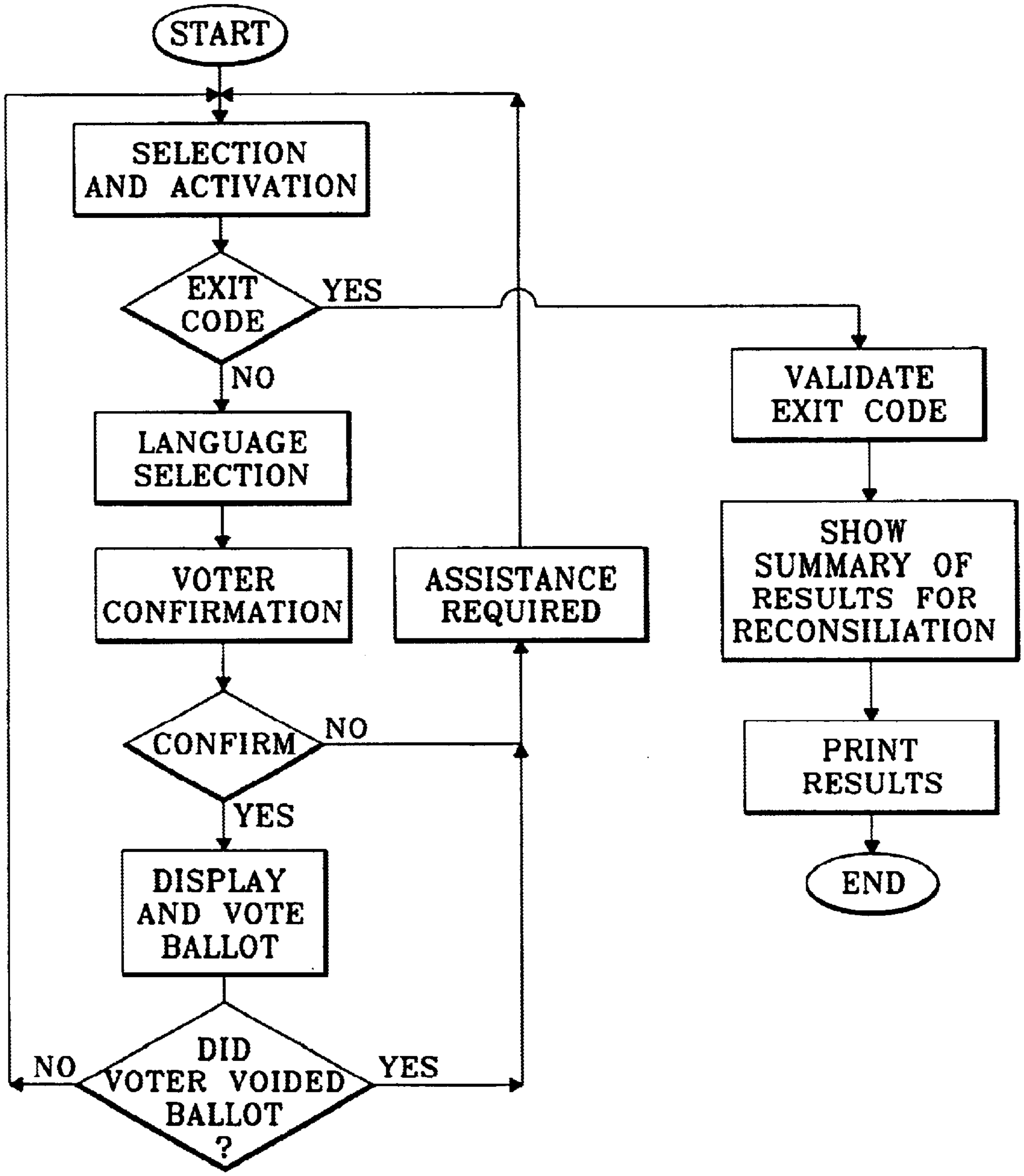
FIG. 6—is a flow chart of the voting procedure with this invention.

The flow chart in FIG. 6 shows some of the choices that may be displayed and permitted, such as multilingual where the voter selects the language. Other choices may be programmed in or not depending upon the original request for programming. The voter is in complete control of the ballots and the speed with which the pages are turned. The voter may touch previous page to return the ballot to check and/or change a vote or to review the ballot at the end. At this point the screen shows "touch here" to cast ballot now. This is the final step. Prior to casting the ballot the voter may touch review to page through their ballot choices and make changes or they can cast the ballot at any time. When "here" is touched the voting is completed and the selections of voter are recorded.

However, if the voter touches "void ballot" a screen will appear telling the voter to notify the poll worker. The poll worker will then reauthorize by keying in the proper authorization code and touch release. The voter may then begin the voting process again.

At the end of the day two poll workers will be required to close the poll. The closing procedures are begun on the same screen as the voter authorization was begun. One poll worker records on separate records provided by election authority the number of votes cast recorded on each voting device by the public counter. Poll worker will enter his/her authorization code on the keypad of voting device number one i.e. the "host voting device" and then touch activate. The poll workers must not activate a ballot style when closing the polls. At this time casting votes is completed for that election. The poll workers will then turn on the printer power switch. A second poll worker will then key in an authorization code, touch "here to close" which will close out the use of the voting devices or stations.

The total ballots cast for each voting device will appear on the screen with grand totals for uses of the voting machines and the ballot styles. These totals must agree as well with the totals of the public counter on each device. If these totals match a poll worker will touch yes. When the results are accepted i.e. the totals match they will automatically be printed out by the printer. The poll workers will then verify that the printed results match the screen totals or results and then sign a certification sheet to that effect.

At this time a post election test which is the same as the pre-election test may be run. The post election test will be run if required by the election authority however it would always behoove the poll workers to ensure authenticity by running the post election test.

After the post election test confirms that the unit was working all the time there may be an electronic transmission of the election reports to any location. It would be necessary to follow to the instructions for uploading election data via modem to a communications server.

The election devices or the voting stations should then be turned off. This may be accomplished automatically or by pressing the start icon and the normal procedures for shut down of the computer.

The poll workers remove the security cards from each voting device and place them in the security envelope along with the printed results. At this time if the election authorities have so deemed, poll workers may post the printed results from the precinct and may transfer the results from the printouts to sheets provided by the election authority. Any results sheets could be posted on the door of the polling place or elsewhere as required by law.

Having described the preferred embodiment, other features of the present invention will undoubtedly occur to those versed in the art, as will numerous modifications and alternations in the embodiments of the invention illustrated, all of which may be achieved without departing from the spirit and scope of the invention as defined in the appended claims.

What is claimed is:

1. An automated voting system comprising:

a) at least one automated voting device;

b) said voting device having an integrated computer program using an integrated pointing device;

c) said voting device having at least one counter for counting votes;

d) said voting device having a graphical user interface for displaying information and ballots;

e) said voting device interconnected to other said voting devices;

f) said integrated computer program allowing a selection of one of said voting devices to control remaining said interconnected voting devices;

g) said votes stored in multiple places in said voting device for retrieval; and, h) test programs to verify the accuracy of said voting system pre and post election.

2. The automated voting device of claim 1 wherein a computer program includes the ability for voter to write in votes and record the write in votes.

3. The automated voting device of claim 2 wherein said voting device includes at least one (1) security check operation.

4. The automated voting device of claim 3 wherein one (1) of said security operations is an external device inserted into said voting device to activate said voting device.

5. The automated voting device of claim 3 wherein a seal, having a unique identification number, is provided by election authorities is affixed to said voting device and the unique seal identification number is recorded separately from said voting device.

6. The automated voting system of claim 1 wherein said voting system includes at least one (1) security check operation.

7. The automated voting system of claim 6 wherein one (1) of said security operations is an entry of an internal password provided by an election authority.

8. The automated voting device of claim 1 wherein a touch screen is the only interface between a voter and the automated voting device.

9. The automated voting device of claim 1 wherein said computer program permits the voter to void a ballot prior to casting.

10. The automated voting device of claim 1 wherein the computer program includes one (1) or more languages and a voter can access the language of choice.

11. The automated voting device of claim 1 wherein a voter confirms on said interface all selections made by poll workers and as portrayed on the interface.

12. The automated voting system of claim 1 wherein a printer is connected to said voting system for printing results of the vote on said system.

13. The automated voting system of claim 1 wherein the plurality of interconnected automated voting devices are controlled as to the a selection of valid information by any one of said automated voting devices chosen to control said automated voting system.

14. The automated voting system of claim 13 wherein said automated voting devices are programmed to transfer data associated with the voting to other locations while maintaining vote results from individual automated voting devices separate.

* * * * *